March 3, 1970 J. L. WILKI 3,498,030
CLEANING DEVICES FOR GAS FILTERING APPARATUS
Filed Nov. 1, 1967 2 Sheets-Sheet 1

INVENTOR
John L. Wilki

INVENTOR
John L. Wilki

United States Patent Office 3,498,030
Patented Mar. 3, 1970

3,498,030
CLEANING DEVICES FOR GAS FILTERING
APPARATUS
John L. Wilki, 1511 Spring Lane,
Wilmington, Del. 19809
Filed Nov. 1, 1967, Ser. No. 679,933
Int. Cl. B01d 45/06, 45/04
U.S. Cl. 55—302                                    1 Claim

ABSTRACT OF THE DISCLOSURE

An apparatus having a dust-laden gas chamber, a filtered gas chamber provided with a supported filter bag, a movable tubular casing suspended over the filter bag, and a nozzle coaxially mounted therewith to provide an application of high pressure gas into said casing wherein the high pressure gas release induces a flow of filtered gas into the filter bag simultaneously with the seating of the tubular casing about the filter bag opening.

---

This invention relates to cleaning devices for air or other gas filtering apparatus, more particularly to the kind of device for use in a reverse flow system of filter cleaning wherein air or gas is forced through the filter medium in the opposite direction to the normal flow of dust-laden air or gas to remove the solid matter adhering to the dirty side of said filter medium.

A cleaning device according to this invention comprises a high pressure air or gas inlet pipe, a movable hollow casing, and suspension means for said hollow casing. Injection of high pressure air or gas, hereinafter referred to as air, into the top of said hollow casing induces a flow of filtered air or gas, hereinafter referred to as air, into and through said hollow casing, causing said hollow casing to contact the filter chamber outlet simultaneously with the injection of a mixture of high pressure air and filtered air into the filter chamber for reverse flow cleaning of the filter medium.

Figure 1:
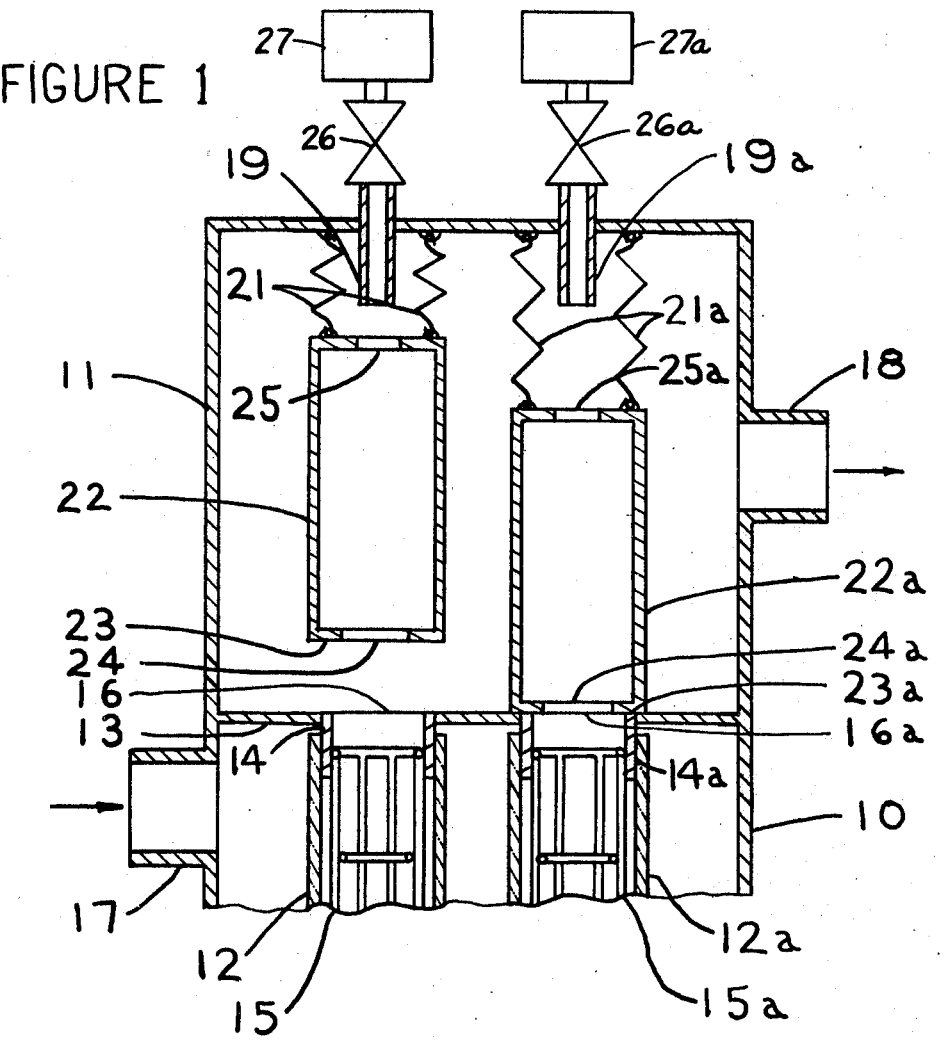
Figure 2:
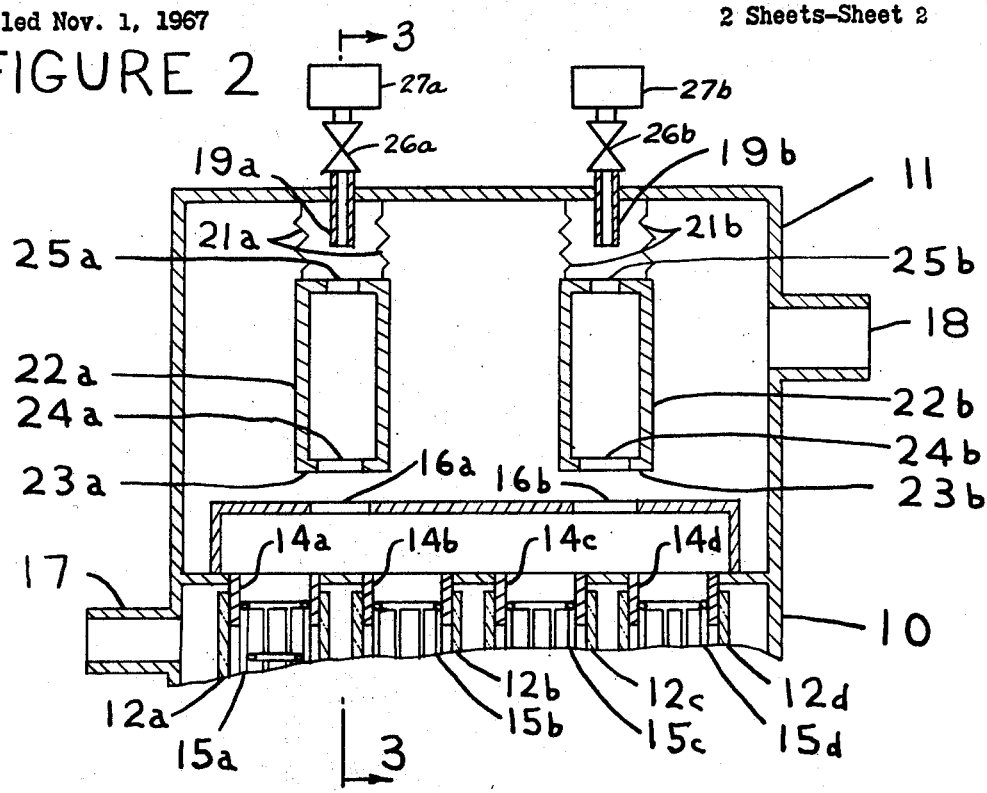
Figure 3:
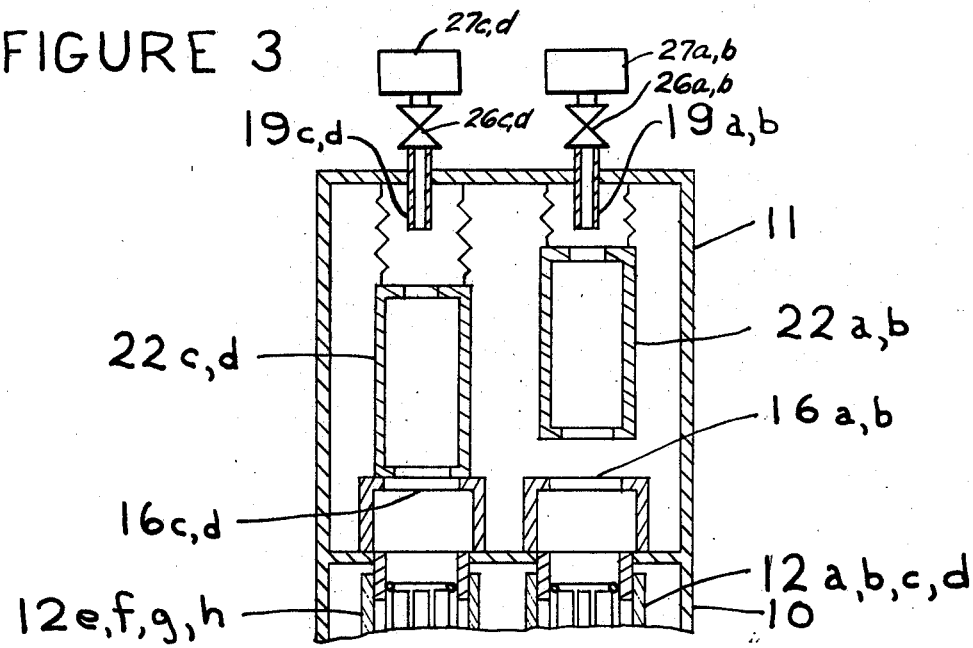

A fuller understanding of the invention may be had by referring to the following description and claim, taken in conjunction with the accompanying drawings, in which:

FIGURE 1 presents an air filtering apparatus showing how the present invention is applied to a filter chamber defined by one filter bag;

FIGURES 2 and 3, taken together, present an air filtering apparatus showing how the invention is applied to a filter chamber defined in part by several filter bags connected to a common manifold.

In FIGURE 1, the invention is shown in an air filtering apparatus comprising a lower chamber 10 which normally contains dust-laden air, and an upper plenum 11 which normally contains filtered air. Tubesheet 13, having sleeves 14, 14a, rigidly attached and sealed thereto, defines the boundary between said lower chamber 10 and said upper plenum 11. Filter bags 12, 12a each having one end closed, are mounted on rigid frames 15, 15a, and sealed to sleeves 14, 14a, to provide two filter chambers, each defined in part by a filter bag surface and each having a single top opening 16, 16a, through which filtered air enters into plenum 11 during air filtration. High pressure air injection nozzles 19, 19a, and movable hollow casings 22, 22a, are arranged on the axis of filter chamber outlets 16, 16a. Nozzles 19, 19a, are connected to a high pressure air source 27, 27a having external means for providing brief applications of high pressure air 26, 26a as required for reverse flow cleaning of the filter medium.

Hollow casing 22 comprises a non-porous shell having a bottom surface 23, a bottom opening 24, and a top opening 25, with said openings sized, positioned, and aligned to enable a flow of high pressure air injected through nozzle 19 to induce a flow of filtered air from plenum 11 into and through hollow casing 22 and into its filter chamber for reverse flow cleaning according to this invention. The flow of the resulting air mixture through hollow casing 22 causes it to move downward until its bottom surface 23 contacts filter chamber outlet 16 in a sealing position so that continued flow of said air mixture through hollow casing 22 enters its filter chamber for reverse flow cleaning of the filter medium. For proper functioning according to this invention, the outside dimensions of bottom surface 23 must exceed the outside dimensions of filter chamber outlet 16, the area of top opening 25 must be larger than the area of nozzle 19, and the area of filter chamber outlet 16 must be larger than the area of bottom opening 24.

The reverse flow cleaning devices mounted above filter chamber outlets 16, 16a, are identical in design and function. In FIGURE 1, hollow casing 22 is shown in the position it occupies during air filtration and hollow casing 22a is shown in the position it occupies during reverse flow cleaning. Termination of the high pressure air injection stops reverse flow cleaning and permits springs 21, 21a, to return hollow casings 22, 22a, to their suspended position as shown for hollow casing 22 in FIGURE 1. When they are in their suspended positions during air filtration, hollow casings 22, and 22a, provide openings between filter chamber outlets 16, 16a, and bottom surfaces 23, 23a, that are a part of the normal flow path for filtered air entering plenum 11.

During air filtration, the dust-laden air enters the air filtering apparatus through nozzle 17 into lower chamber 10 and passes through filter bags 12, 12a, depositing the solids of concern on the outside surface of filter bags 12, 12a. The filtered air flows through filter chamber outlets 16, 16a, into plenum 11, from which the filtered air is removed via nozzle 18. The filter medium is subjected to reverse flow cleaning according to this invention to maintain filter medium porosity. The solids dislodged from the filter bag surfaces during reverse flow cleaning fall to the bottom of lower chamber 10 for subsequent removal by other means.

FIGURE 2 presents a sectional view of an air filtering apparatus having a filter chamber defined in part by four filter bags 12a, b, c, d, and having two filter chamber openings 16a, b, through which filtered air enters into plenum 11 during air filtration.

FIGURE 3 presents an end view of the air filtering apparatus of FIGURE 2 which shows that said air filtering apparatus contains two identical filter chambers.

Cleaning devices according to this invention are arranged on the axis of each of said filter chamber outlets 16a, b, c, d, said cleaning devices being identical in design and function to those described in relation to FIGURE 1. When one filter chamber like that presented in FIGURE 2 has two or more openings 16a, b, through which filtered air enters plenum 11, it is a requirement that all cleaning devices servicing said filter chamber operate in unison during air filtration and during reverse flow cleaning. In FIGURES 2 and 3, hollow casings 22a, b, are shown in the position they occupy during air filtration, and hollow casings 22c, d, are shown in the position they occupy during reverse flow cleaning. The apparatus of FIGURES 2 and 3 is provided with high pressure air injection nozzles 19a, 19b, 19c, 19d connected to high pressure air source 27a, 27b, 27c, 27d and includes means for providing brief applications of high pressure air 26a, 26b, 26c and 26d.

Gas filtering apparatus according to the designs presented in FIGURES 1, 2, and 3, may contain filter chambers defined in part by any number of filter bags and having any number of filter chamber outlets. For the air filtering apparatus illustrated in FIGURE 1, the numerical ratio of filter bags to filter chamber outlets is 1:1; and for the air filtering apparatus illustrated in FIGURES 2 and 3, the numerical ratio of filter bags to filter chamber outlets is 2:1. Even higher ratios of filter bags to filter chamber outlets may be utilized at times. However, it is not practical to have one reverse flow cleaning device according to this invention service more than 50% of the filter bags in an air filtering apparatus designed for continuous gas filtration without interruption for cleaning.

It is not required that all filter chambers in one air filtering apparatus have the same number of filter bags, the same number of filter chamber outlets, or even the same ratio of filter bags to filter chamber outlets. These are design factors which may be varied within one air filtering apparatus to suit requirements. For example, an air filtering apparatus having a cylindrical housing and a circular filter bag field, might have a total of four filter chambers, of which two filter chambers are each defined in part by six filter bags and having two filter chamber outlets, and the other two filter chambers are each defined in part by four filter bags having two filter chamber outlets. Alternatively, the two filter chambers each defined in part by six filter bags might have three filter chamber openings. Every filter chamber outlet would have a cleaning device according to this invention arranged on its axis, and the reverse flow cleaning devices servicing any one filter chamber would be required to operate in unison.

Continuous air filtration can be achieved in air filtering apparatus like those illustrated in FIGURE 1 and in FIGURES 2 and 3, if each of the two filter chambers are cleaned alternately, preferably at regular intervals, while the other remains in filtering service. Continuous air filtration can be achieved in an air filtering apparatus having more than two filter chambers if each of the filter chambers are cleaned, in turn, while the others remain in gas filtering service. Alternatively, in air filtering apparatus having a large number of filter chambers, a group of filter chambers may be cleaned at one time, but this group would represent a small proportion of the total number of filter chambers in said apparatus.

Descriptions to this point have referred to vertically suspended filter bags and reverse flow cleaning devices. It is possible to use other orientations. The filter bags may extend upward or on any other angle of convenience. The axes of the reverse flow cleaning devices must be aligned with the filter chamber outlets, but said axes need not coincide with or be parallel to the axes of the filter bags. Reverse flow cleaning devices according to the present invention may operate along horizontal axes or any other alignment. The suspension means may be something other than the springs 21, 21a, 21b, shown in FIGURES 1, 2, and 3, and it may be required to use different suspension means for other reverse flow cleaning device axis orientations. Other suspension means in addition to the tension springs illustrated are compression springs, strands of elastomers, weighted pulley-and-line arrangements, pneumatic flotation, gravity, and any other suspension means capable of returning a movable hollow casing as described from its position in contact with its filter chamber outlet during reverse flow cleaning, to its position during filtration, suspended between its filter chamber outlet and its high pressure air injection nozzle.

The movable hollow casing may be of other shapes in addition to the cylindrical shape illustrated in FIGURES 1, 2, and 3. Said movable hollow casing may have a shape that is conical, pyramidal, cubical, venturi-shaped, or any other shape that has a non-porous shell, a bottom sealing surface, a bottom opening, and a top opening as previously described.

Reverse flow cleaning of the filter medium according to this invention may be accomplished at any filter chamber pressure higher than the pressure at which the filtered air passes from the filter chamber outlet into the plenum during filtration. However, it is not suitable to perform reverse flow cleaning according to the present invention at filter chamber pressures so high that the filter bags are ruptured immediately or after a relatively short period of operation. The source pressure of the high pressure air is largely a matter of convenience because the reverse flow cleaning device can be designed for operation with any high pressure air supply capable of producing an abrupt pressure rise in filter chamber pressure and a brief reverse flow though the filter medium. Short cleaning times are preferred, suitably as short as it is possible to make them.

The advantages of a reverse flow cleaning device according to this invention are related to the contact of a hollow casing as described with its filter chamber outlet, simultaneously with the injection of a mixture of high pressure air and an induced flow of filtered air into the filter chamber fo reverse flow cleaning. One advantage is that the design of the cleaning device can be optimized without interference with the normal flow path of filtered air through the air filtering apparatus. Another advantage is the ease with which one reverse flow cleaning device can be applied to a filter chamber outlet servicing several filter bags connected thereto. Still another advantage is that a reverse flow cleaning device according to the present invention can be designed for operation using high pressure air for cleaning at almost any available pressure.

I claim:

1. In an apparatus for filtering solids from dust-laden gas comprising a vertical housing having an inlet for dust-laden gas, an outlet for filtered air, a tubesheet extending across said housing between the inlet and the outlet dividing the housing into dust-laden gas and filtered gas chambers, the tubesheet including an aperture, a filter bag supported in the dust-laden gas chamber with the open end sealed about the aperture, and the housing having a top wall positioned above and spaced from the tubesheet, a tubular casing provided with an impervious side wall and top and bottom end walls, the top and bottom end walls each including a central opening with the opening in the top end wall being smaller than the opening in the bottom end wall, the tubular casing being suspended from the top wall of the housing by longitudinally extending spaced springs, a nozzle positioned above the casing and extending through the top wall, said nozzle being connected to a high pressure air source external of the housing and including means for providing brief applications of high pressure air, the filter bag, casing, and nozzle being mounted in coaxial relation, the bottom wall of the casing being of greater size than the aperture in the tubesheet, whereby during injection of high pressure gas from said nozzle filtered gas is induced into the tubular casing causing the bottom end wall of the casing to seat about the aperture in the tubesheet and direct a brief reverse flow of gas through the filter bag.

References Cited
UNITED STATES PATENTS

| | | | |
|---|---|---|---|
| 1,127,242 | 2/1915 | Hay | 55—302 |
| 1,944,267 | 1/1934 | Rathbun | 55—294 |
| 2,338,419 | 1/1944 | Forrest et al. | 210—412 |
| 2,765,048 | 10/1956 | Hershey | 55—294 |
| 2,850,112 | 9/1958 | Dru | 55—294 |
| 2,974,748 | 3/1961 | Swanson | 55—341 |
| 2,976,953 | 3/1961 | Haas et al. | 210—323 |
| 2,980,207 | 4/1961 | Allen | 55—302 |
| 3,123,132 | 3/1964 | Hedgecock | 210—333 |
| 3,167,415 | 1/1965 | Edwards | 55—302 |
| 3,377,783 | 4/1968 | Young | 210—333 |
| 2,804,168 | 8/1957 | Church | 55—96 |

FOREIGN PATENTS 225,059  10/1959  Australia.

HARRY B. THORNTON, Primary Examiner

B. NOZICK, Assistant Examiner

U.S. Cl. X.R.

55—341